Nov. 13, 1928.
F. A. SLAYTON
GLASS TUBE CUTTER
Filed Nov. 18, 1926
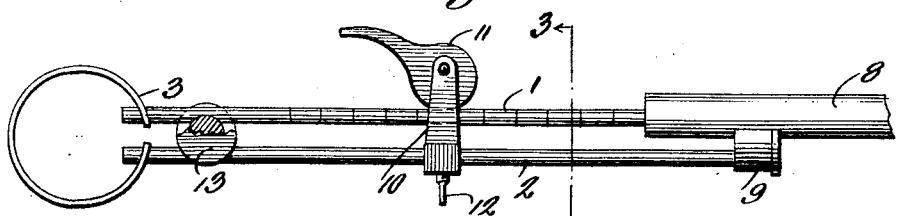
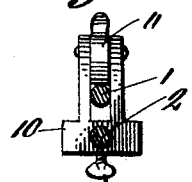
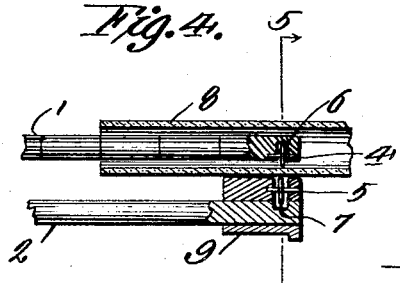
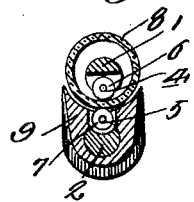
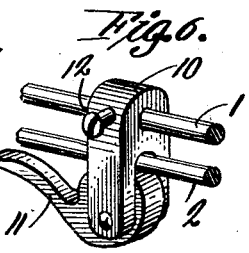
WITNESSES
Inventor
FRANK A. SLAYTON
By Richard B. Owen
Attorney Patented Nov. 13, 1928.

1,691,530

UNITED STATES PATENT OFFICE.

FRANK A. SLAYTON, OF WASKOM, TEXAS.

GLASS-TUBE CUTTER.

Application filed November 18, 1926. Serial No. 149,228.

My present invention relates to a glass cutter. It is especially adapted for cutting glass tubes to adjusted lengths. The invention consists of a parallel pair of spring-pressed rods carrying at their free ends a pair of small hardened steel rollers journaled for transverse rotation relatively to the axis of the rod and an adjustable clamp movable longitudinally along the rod and provided with means for varying the pressure on the cutting rollers. The essential feature therefore of my invention comprises a cutting tool composed of a pair of parallel rods having transversely rolling hardened steel rollers at their ends and a clamp adjustable longitudinally of the rod to vary the cutting pressure of the rollers. It comprises also other more specific features the construction of which will be more particularly hereinafter described in the specification, and the novel features of which will be specifically pointed out in the appended claim.

In the accompanying drawings:

Figure 1 represents an elevation of a glass cutter embodying my improvements in use, Figure 2 is a plan view of the same, Figure 3 is a section on the plane 3—3 of Figure 1, Figure 4 is a section illustrating the instrument in operation of cutting, Figure 5 is a section on the plane 5—5 of Figure 4, and Figure 6 is an isometric projection of the rods or rails in which the rollers are mounted illustrating a slightly modified form of clamping member.

Referring now in detail to the drawings 1—2 represents a pair of parallel rails or bars of a stiff metal of a suitable cross section. At one end the rods are mounted and soldered or brazed in a large bow spring 3 of ribbon tempered steel of suitable cross section to elastically control the rods with a stiff resiliency. At the opposite ends of the rods are mounted on longitudinal pivots 4—5 in drilled holes, a pair of small hardened steel rollers 6—7 with very sharp cutting edge and a small diameter, about three sixteenths of an inch, whereby relatively high speed will be effected when a tube or other glass device 8 is rolled under the rollers. The rod 1 is graduated with a number of marks embossed or engraved circumferentially around it at different distances along its axis and this rod is adapted to be placed directly in the tube to be cut at which the rollers are mounted and on the rod 2 is a semi-circular rest 9 with an arc shaped face to receive and support a round glass tube. Along the rod 2 is a movable clamp embodying a yoke 10 to which is pivoted a cam 11 for engaging the rod 1 to adjust the clamping pressure on the rolling cutter. A set screw 12 permits the yoke to be clamped at any desired position along the rod. A grooved roll 13 engages the rods near the spring end and affords a fulcrum to give increased elasticity to the spring. This feature greatly stiffens the device as the cam already described is capable of greatly increasing cutting power with adjustment away from the stiffening roller near the spring.

In using the device the cam lever is thrown up and a tube of glass inserted on the rod 1 between the rollers for any desired distance. The cam is adjusted to produce a hard pressure on the rollers and the roll adjusted for a trial cut acts as a fulcrum and a quick turning movement, by the hand gripping the spring makes a circular groove in the glass at the point desired, and the ends may be readily severed. If however, the rollers do not cut the cam is tightened or the roller 13 may be shifted outward.

In Figure 6, I have shown the yoke 10 slidably carried by the rod 1, with the cam engaging the rod 2. In this form the yoke is rounded to eliminate sharp corners and the set screw 12 projects laterally from one side thereof.

Having thus described my invention, what I claim as new and desire to secure by Letters Patent is:

A glass cutting tool comprising a pair of parallel rods with hardened steel rollers at their ends movable transversely at the edges of the rods, a bow spring controlling the resiliency of the rods, a grooved annular spacer between the rods, and an adjustable clamp to vary the pressure of cutting movable relative to the spacer.

In testimony whereof I affix my signature.

FRANK A. SLAYTON.